A. S. GEAR.
Belt for Transmitting Power.
No. 227,163. Patented May 4, 1880.
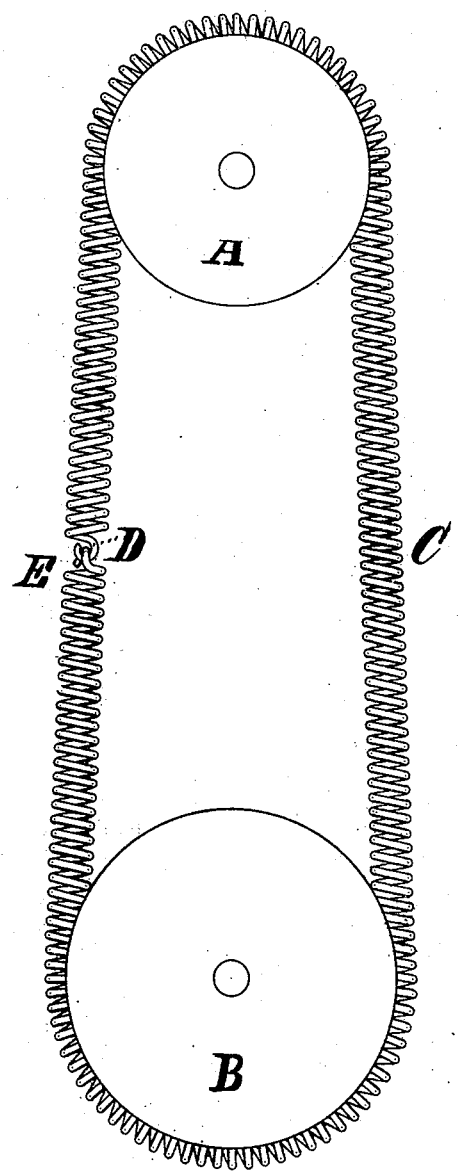
Witnesses: Wm H Browne, Murray S Dunbar
Inventor: Alonzo S Gear

UNITED STATES PATENT OFFICE.

ALONZO S. GEAR, OF NEW YORK, N. Y.

BELT FOR TRANSMITTING POWER.

SPECIFICATION forming part of Letters Patent No. 227,163, dated May 4, 1880.

Application filed February 14, 1880.

*To all whom it may concern:*

Be it known that I, ALONZO S. GEAR, of the city, county, and State of New York, have invented a new and useful Perpetual Compensating Tension-Belt; and I do hereby declare that the following, taken in connection with the drawings which accompany and form part of this specification, is a description of my invention sufficient to enable those skilled in the art to practice it.

This invention relates to an improved belt for transmitting power.

The invention consists in making a belt from helically-coiled wire or of wire coiled upon any suitably-formed mandrel, the object of said belt being for the purpose of maintaining a uniform tension, and for compensating for varying resistance and distance, and for utilizing a higher degree of the power expended, and to obviate the difficulties heretofore existing in running machinery by power.

An important advantage of this belt over others in use is that the wear of machinery is greatly lessened.

When my belt is made in a round form it is constantly changing its exterior position or rotating at right angles to its forward motion while passing around the pulleys, thus wearing the surface of the coil uniformly.

The drawing represents a coiled belt, C, passing around two pulleys, A and B, the faces of which are formed so as to conform to the exterior of the belt or belts.

When the belt is wrapped around the pulleys the two ends are held together by means of two hooks, E, or hook and eye D, or the ends may be held together by screwing a flexible plug into the bore of the coil.

I am aware that there have been elastic connections made from coiled wire and used as a means of fastening the ends of leather belts. To these devices I lay no claim; but What I do claim as new, and desire to secure by Letters Patent, is—

1. The herein-described belt, made from suitably-coiled wire, substantially as shown and described, for the purpose specified.

2. As a new article of manufacture, the herein-described belt, consisting of coiled wire provided with suitable end connections, substantially as and for the purpose specified.

ALONZO S. GEAR.

Witnesses:
 A. VANCE,
 JOHN BLEWITT.